Aug. 30, 1966     L. DEPETRIS     3,268,929
BOOK COVER MANUFACTURING MACHINE

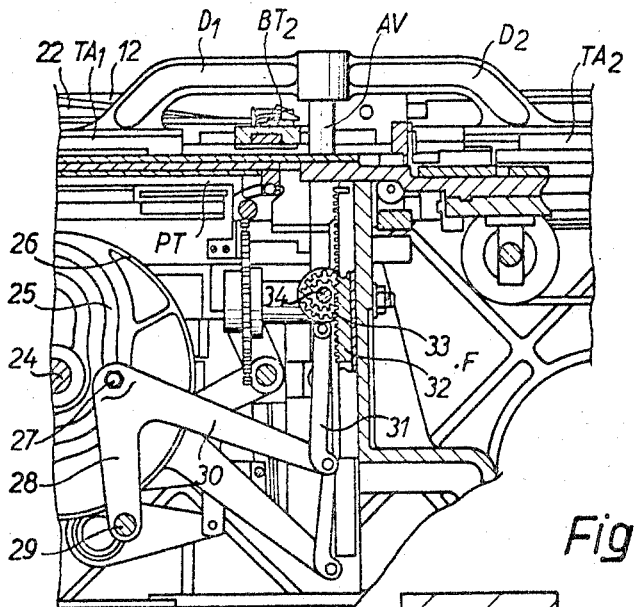
Fig. 2
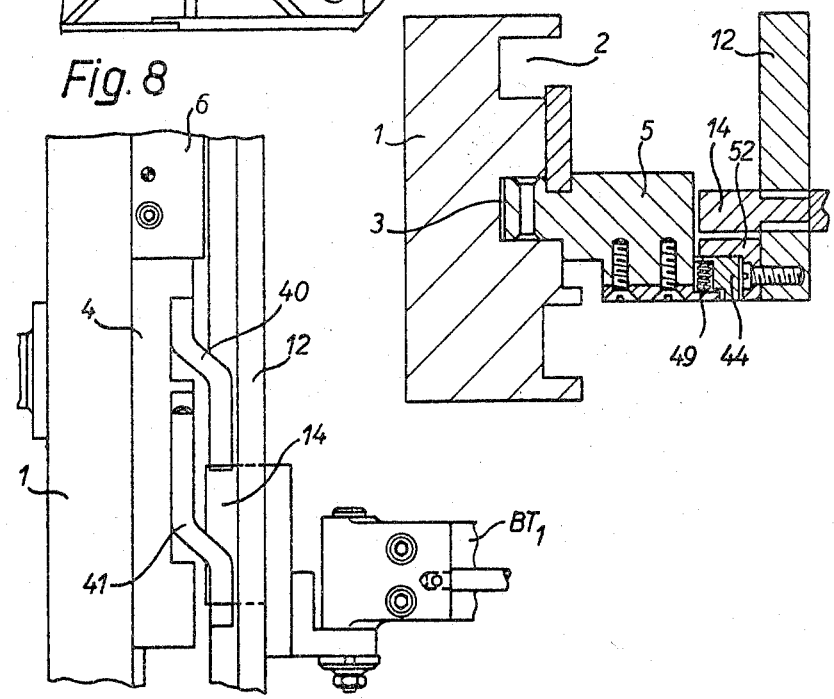
Fig. 15
Fig. 8

Filed Dec. 7, 1964     6 Sheets-Sheet 3

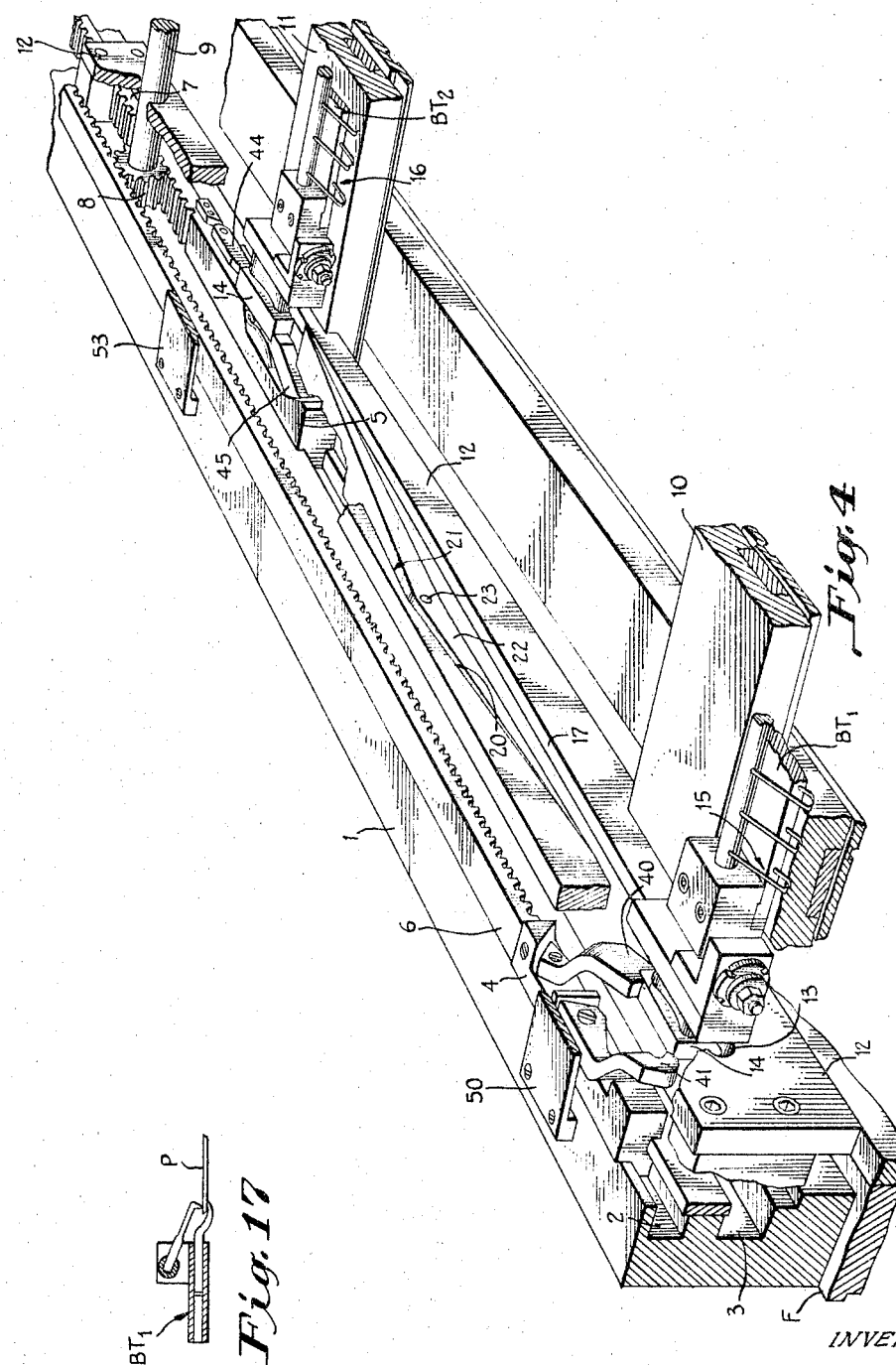

Aug. 30, 1966  L. DEPETRIS  3,268,929
BOOK COVER MANUFACTURING MACHINE
Filed Dec. 7, 1964  6 Sheets-Sheet 5
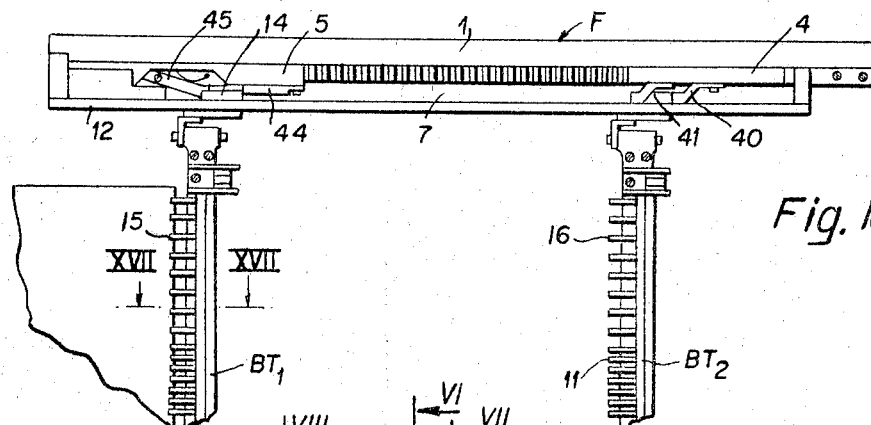
Fig. 16
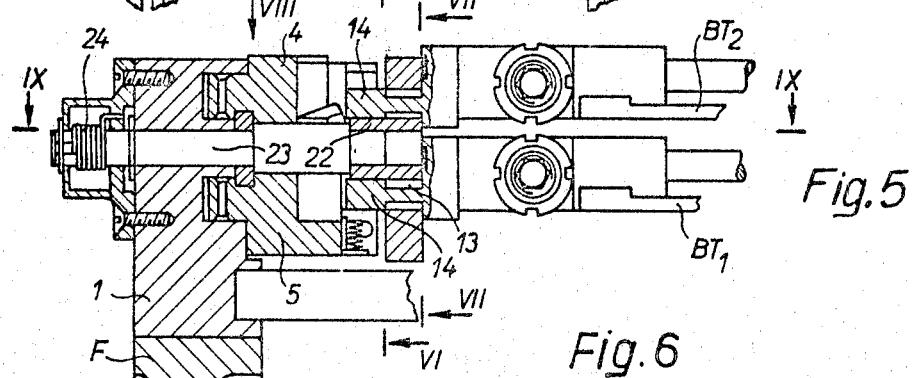
Fig. 5
Fig. 6
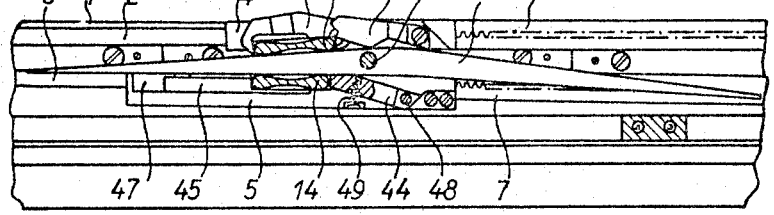
Fig. 7
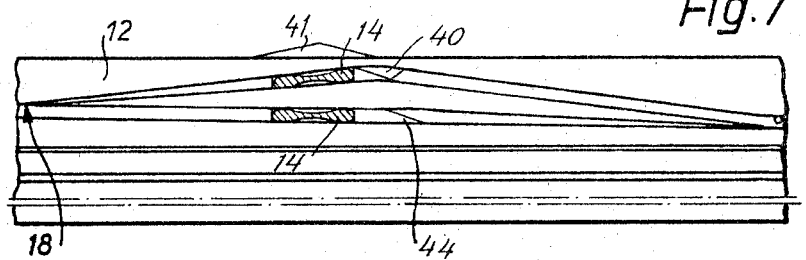

Aug. 30, 1966     L. DEPETRIS     3,268,929

BOOK COVER MANUFACTURING MACHINE

Filed Dec. 7, 1964     6 Sheets-Sheet 6

United States Patent Office 3,268,929
Patented August 30, 1966

3,268,929
BOOK COVER MANUFACTURING MACHINE
Lorenzo Depetris, Milan, Italy, assignor to
Smyth Europea S.p.A., Milan, Italy
Filed Dec. 7, 1964, Ser. No. 416,340
Claims priority, application Italy, Dec. 10, 1963,
25,597/63
9 Claims. (Cl. 11—2)

This invention relates to a machine for manufacturing book covers, which is provided with an improved device for transferring the sheets or so called "cloths" used for lining the book covers from the so called "cloth cylinder" to the movable platform of the machine.

It is known that the book covers are composed of two boards and an intermediate back portion, glued to an outer lining sheet or cloth, the margins of which are folded around the periphery of the unit formed by the paper board elements and back portion, the lining being glued to the paperboard elements and back portion.

Machines for manufacturing book covers are further known which generally comprise a frame; a device provided with a rotary cylinder or so-called "cloth cylinder" carrying along the lining sheets and an applicator roller cooperating with the "cloth cylinder" for applying adhesive to said sheets; a vertically movable platform on which the paperboard blanks and back portion are superimposed and secured to the lining sheet, means for receiving the adhesive-coated lining sheets from the "cloth cylinder" and transferring them to said platform, means cooperating with said platform adapted for bending over the marginal portions of said lining sheets; a paperboard blank and back portion supply device comprising two chargers containing the paperboard blanks and a spool, respectively, for the tape from which the back portions are made; a "feed station" for the paperboard blanks; a mechanism for transferring the paperboard blanks from the chargers and the tape from the spool to the feed station; a conveyor means comprising at least one suction head carried by an upright vertically displaceable step by step rotatable shaft for receiving the paperboard blanks and back portions from the feed station and transfer them to the platform; means for removing the finished book covers from the platform and discharging them from the machine, finally, driving means comprising a main driving or cam shaft, cams mounted on said shaft, leverages and secondary transmissions adapted to synchronously operate the above-mentioned machine mechanisms.

A book cover manufacturing machine with the above-mentioned features will be called in the following specification and claims as a machine of the type referred to.

In known machines of the type specified said means for receiving the adhesive-coated "cloths" or lining sheets from the "cloth cylinder" and transferring them to said platform, comprise a bar which keeps constantly parallel with the axis of the "cloth cylinder" and is movable between two positions near said cylinder and a position near the vertical shaft supporting the suction head. The bar is provided with pincers operated to engage the adhesive-coated "cloth" supplied by the "cloth cylinder" and released by the pincers on the latter, and to release the said "cloth" after it has been placed on the vertically movable platform during displacement of the bar in the direction of the vertically displaceable shaft carrying the suction heads.

This manner of operation is satisfactory, more particularly with machines having one suction head only, in which on each turn of the vertically displaceable shaft, required for feeding the paperboard blanks and back portion from the feed station to the said vertically movable platform and restoring the suction head to its initial position, the bar provided with pincers reciprocates once between a position near the "cloth cylinder" and a position near the vertically displaceable shaft carrying the suction head. However, since reciprocation of the bar should obviously take place during the operative step of the machine, at which the suction head is lifted from the vertically movable platform by an extent sufficient to let the bar through, the translational speed of the bar should be relatively high.

A still higher rate of speed is required by machines of the type in which the vertically displaceable shaft carries two or a plurality of suction heads, inasmuch as the bar should effect two or a plurality of reciprocations during each full turn of the said shaft. The high translational speed of the bar raises serious problems due to inertia and behaviour of the "cloths" after the latter have been received by the pincers on the bar.

This invention provides a machine of the type referred to having two suction heads, by which two book covers are manufactured on each full turn of the vertically displaceable shaft, said machine avoiding the above-mentioned drawbacks.

According to this invention, with the above objects in view a machine for manufacturing book covers of the type referred to, having two suction heads, comprises a pair of bars equipped with pincers for transferring the "cloths" from the "cloth cylinder" to the vertically movable platform, means being provided for moving said bars simultaneously in opposite directions along paths having superimposed terminal portions and staggered distinct middle portions.

Further characteristic features and advantages of this invention will be clearly understood from the appended description, given by way of example, of an embodiment shown on the accompanying drawings, wherein:

FIGURE 2 is a part sectional view on line II—II of FIGURE 1,

Figure 3:
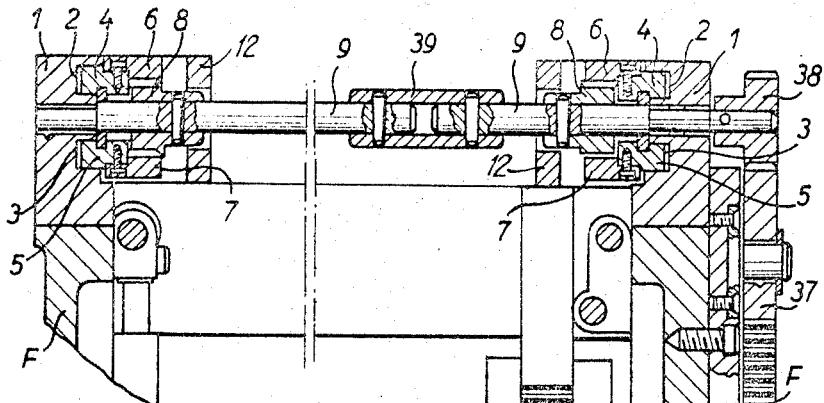
Figure 9:
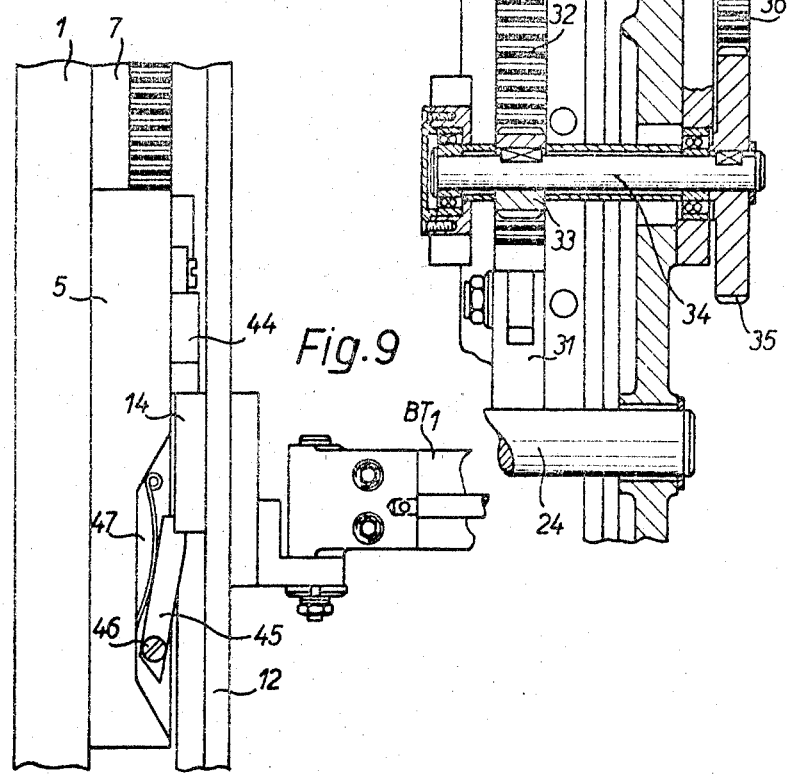
Figure 10:
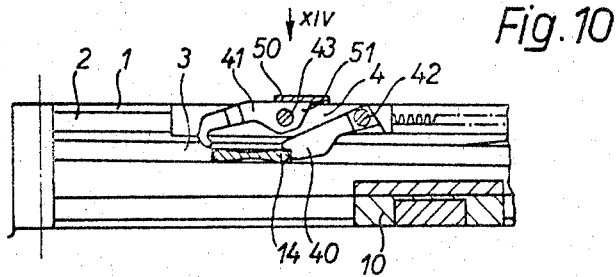
Figure 12:
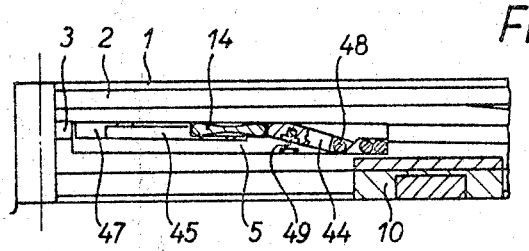
Figure 14:
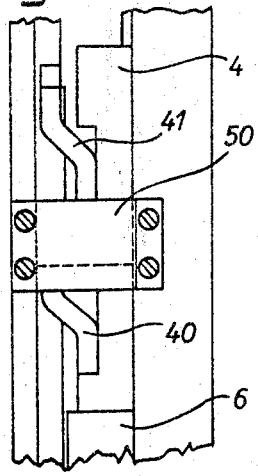
Figure 11:
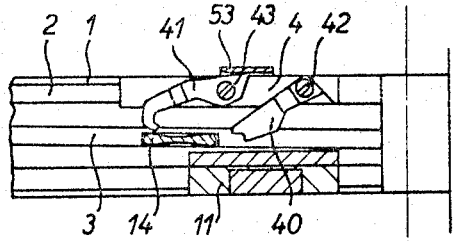
Figure 13:
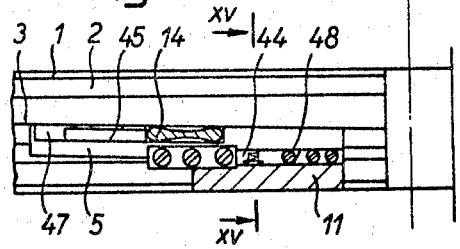

FIGURE 3 is a cross sectional view showing details of the drive for the bars equipped with pincers, FIGURE 4 is a perspective view of the side wall of the machine and the relation of the fabric gripping bars thereto, FIGURE 5 is a cross sectional view of the top portion of one side wall of the machine, showing the ends adjacent said side wall of the bars equipped with pincers, at the stage at which the said bars are superposed, FIGURE 6 is a sectional view on line VI—VI of FIGURE 5, FIGURE 7 is a sectional view on line VII—VII of FIGURE 5, FIGURE 8 is a view in the direction of the arrow VIII in FIGURE 5, FIGURE 9 is a sectional view on line IX—IX of FIGURE 5, FIGURES 10 and 11 are diagrammatical part sectional elevational views showing two opposed end positions of the machine members transferring the bars from their end position near the vertical shaft to a position near the cloth cylinder, FIGURES 12 and 13 are diagrammatical part sectional elevational views showing two opposed end positions of the machine members moving the bars towards said vertical shaft;

FIGURE 14 is a view in the direction of the arrow XIV in FIGURE 10,

FIGURE 15 is a sectional view on line XV—XV of FIGURE 13, on an enlarged scale,

FIGURE 16 is a plan view of the fabric shifting bars with the pincers on one of the bars gripping a piece of fabric and FIGURE 17 is a sectional view on the line XVII—XVII of FIGURE 16.

Figure 1:
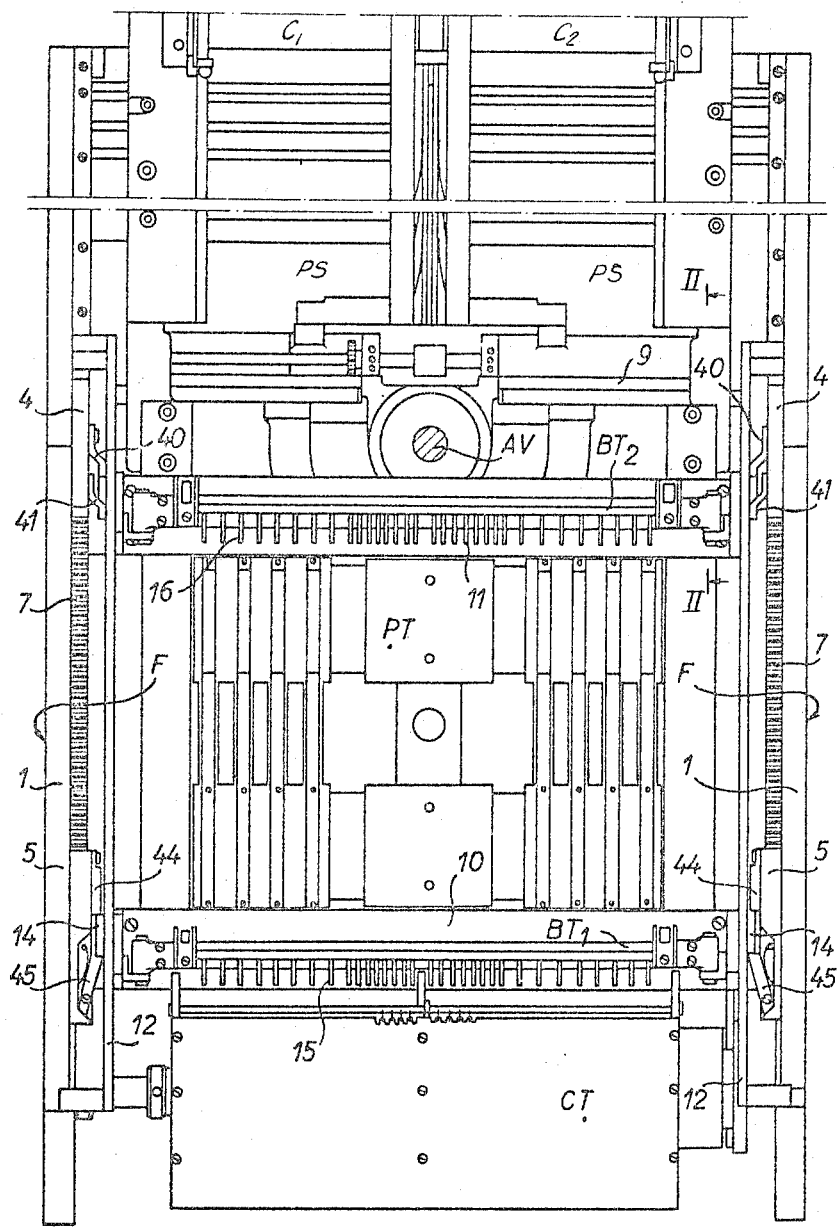
FIGURE 1 is a part plan view of the machine according to this invention.

In the plan view in FIGURE 1, C1, C2 denote the two chargers adapted to contain each a pile of paperboard blanks (not shown) adapted to form the top and bottom faces of the book cover. At the feed or squaring station PS two similar paperboard blanks supplied by the chargers C1, C2 are placed with their edges facing the back portion pending their transfer to the vertically movable platform PT, on which the paperboard blanks and back portion are glued to a lining sheet or "cloth" coated with adhesive. The "cloth cylinder" CT applies adhesive to the lining sheets and delivers the latter to the conveyor bar BT1 or BT2, respectively, which transfer the sheets towards the platform PT. A vertically displaceable shaft AV is provided with two aligned cross arms D1, D2 (FIGURE 2), each carrying a suction head $TA_1$, $TA_2$, respectively, adapted to receive the paperboard blanks and back portions from the feed station PS and support them till they are placed on the lining sheet carried by the platform PT.

The machine further comprises two opposite side walls F braced by stiffening cross walls (FIGURE 1).

All above parts as well as further constructional details, known per se, of the machine can be of the construction such as described in detail in co-pending applications Ser. Nos. 334,866 and 334,867 filed December 31, 1963, 371,897 filed June 2, 1964, now Patent No. 3,237,223, 382,603 filed July 15, 1964, now Patent No. 3,237,758.

Longitudinal members 1 of rectangular cross section are placed on the top of the side walls F (FIGURE 1). Longitudinal grooves 2, 3 (FIGURE 5) are cut in the faces of the longitudinal members turned towards the longitudinal middle plane of the machine, and have slidably mounted therein slides 4, 5, respectively, (FIGURE 5). The slide 4 is secured to a rack 6 which is likewise slidably mounted in groove 2, the slide 5 being secured to a rack 7 likewise slidable in groove 3 (FIGURES 4 and 6). The rack pairs 6, 7, the sets of teeth in which face one another, mesh with pinions 8 keyed to the divided cross shaft 9 extending from one side wall to the other (FIGURE 3). With this construction operation of the shaft 9 together with the pinions 8 results in simultaneous displacements in opposite directions of the racks 6, 7 together with the slides 4, 5 situated at the opposite side walls of the machine. As the rack 6 together with slide 4 moves in the direction of the forward "first fold" bar 10 arranged in proximity to the "cloth cylinder," the rack 7 together with slide 5 moves in the direction of the rear "first fold" bar 11 (FIGURES 4 and 1), that is, in the direction of the transverse shaft of the machine in which the axis of the vertically displaceable shaft AV carrying the suction heads is situated. Plates 12 (FIGURE 15) are arranged parallel with the faces of the longitudinal members 1 in which the grooves 2, 3 are formed, and are apertured at 13 (FIGURE 7) for guiding the ends 14 of the bars BT1 and BT2 (FIGURE 5) carrying the pincers diagrammatically denoted by 15 and 16 (FIGURE 1). The ends 14 of each bar BT1, BT2 extend through said apertures 13 in the plates 12 and in the direction of the faces of the longitudinal members 1 formed with the grooves 2, 3 for guiding the slides 4, 5, respectively (FIGURE 5).

The plates 12 are secured to the side wall 1 and are spaced therefrom and from the slides 4, 5 (FIGURE 5).

The aperture 13 in each plate 12 is confined at the bottom by a flat edge 17 of a rectilinear lateral profile and at the top by two rectilinear end sections 18, 19 parallel with the edge 17 and at the middle of the aperture 13 by two sections 20, 21, respectively, inclined to each other, to form a flattened inverted V-profile with respect to the edge 17. With this structure the aperture 13 exhibits two aligned end sections, just wide enough to let the ends 14 of the bars BT1, BT2 through, and a middle section which is highest at the middle and slopes down towards said end sections. A two-needle triangular deflector 22 is arranged within the middle portion, each needle being turned in the direction of the end sections of the aperture 13 (FIGURE 6). The deflector 22 is keyed to a pivot 23 rotatably mounted in a hole in the longitudinal member 1 and secured to the latter through the interposition of a spring 24 (FIGURE 5). The spring constantly biases the pivot 23 together with the deflector 22 to cause the deflector end facing the transverse plane in which the axis of the vertically displaceable shaft AV for the suction heads is situated, to adhere to the edge 17 of the aperture 13, and simultaneously cause the other end of the deflector to adhere to the edge 18 of the end of the aperture 13 extending in the direction of the "cloth cylinder" (FIGURE 7). Obviously, on displacement of the bar BT2, which is shown in FIGURE 1 in its position near the transverse plane containing the axis of the vertically displaceable shaft AV, in the direction of the "cloth cylinder" CT, the ends 14 of the bar at first move along the end sections of the apertures 13 in the plates 12, near the said transverse plane, and thereafter ride along the top edges of the deflectors 22 to their topmost position, when the ends of the bar BT2 are located above the pivots 23 (FIGURE 5).

At the same time the bar BT1, which is shown in FIGURE 1 in its position near the cylinder CT, moves in an opposite direction beneath the deflectors 22 (FIGURE 5). A further movement of the bars, due to displacement of the racks 6, 7 by the section of the pinions 8 (FIGURE 4) results in a rotation of the deflectors as required to cause the ends 14 of the bar BT2 to enter in the end sections of the apertures 13, and the ends 14 of the bar BT1 to enter in the end sections of the apertures 13 facing the transverse plane containing the axis of the vertically displaceable shaft AV.

Movement of the pinions 8 keyed to the shaft 9 is derived from the cam shaft 24 (FIGURE 2) having keyed thereto in a manner known per se the cams operating the leverages which effect movement in height and rotation of the vertically displaceable shaft carrying the suction heads, of the vertically movable platform, of the bars folding the cloth and further movements of the other parts of the machine.

Movement of the bars BT1 and BT2 is derived from the face cam 25 (FIGURE 2) formed on the lateral face of the wheel 26 keyed to the cam shaft 24. The cam 25 is engaged by a roller (not shown) carried on the pivot 27 secured to a bell crank lever, the arm 28 of which is fulcrumed at 29 to the stationary machine frame, the longer arm 30 operating through a link 31 and a vertical rack 32 (FIGURES 2 and 3) meshing with a pinion 33 keyed to a pivot 34. Movement is transmitted by the latter through gearing 35–38 to shaft 9 comprising two sections each carrying one of the pinions 8, and interconnected by a sleeve 39.

The above described drive interposed between the cam shaft 24 and shaft 9 carrying the pinions 8 meshing with the racks 6, 7 is such that on each full turn of the vertically displaceable shaft AV carrying the suction heads, the racks 6, 7 and their slides 4, 5 perform two full reciprocations.

Of course, the phase displacement of the various movements is such that the movements of the racks 6, 7 and slides 4, 5 which displace in a manner to be described hereafter the bars BT1 and BT2, take place during the time the suction heads D1, D2 are lifted from the vertically movable platform PT to a position above the bar path, more particularly above the path of the bar moving towards the "cloth cylinder" CT.

Each slide 4 carries a pair of pawls 40, 41, respectively (FIGURES 4 and 10). The pawls are in the form of levers rockingly mounted about pivots 42, 43 and bent to extend beyond the slide 4 in the direction of the guide plates 12 by an extent sufficient to engage the end 14 of either bar BT1, BT2 (FIGURE 8).

The pawl 40 has its free end formed with a V-shaped notch, the pawl 41 having a hooked end (FIGURE 10). The spacing of the fulcra of the pawls is such that the end formed with a V-shaped notch of the pawl 40 engages the edge of the ends 14 of either bar BT1 or BT2 which faces the transverse plane in which the axis of the shaft AV is situated, the hooked end of the pawl 41 engaging the opposite edge even when the pawls 40, 41 are substantially aligned as indicated in FIGURE 4.

The pawls 40, 41 carried by the slide 4 are adapted to move the bar BT1 or BT2 from its position near the shaft AV to its position near the skirt of the cylinder CT. During the movement of the slide 4 in the direction indicated the pawls 40 push the bar ends 14, the pawls 41 being adapted to prevent displacements of the bars in the direction of the cylinder CT due to inertia.

The slide 5 likewise carries two pawls in the form of levers 44, 45, respectively (FIGURES 4–6). The lever 44 is mounted for rotation about a fulcrum 46 secured in a recess 47 in the slide 5. The lever 44 is mounted for oscillation about a fulcrum 48 and is biassed by a spring 49 towards a lifted position so that its free end faces the free end of the lever 45 (FIGURE 12). The lever 45 is biassed by a spring 47 away from the face of the slide 5 facing the guide plate 12 (FIGURE 9). The levers 44, 45 are so arranged that their free ends are spaced by an extent matching the spacing of the opposite edges of the ends 14 of the bars BT1, BT2 (FIGURE 9).

The pawls 44, 45 cause the bar ends situated near the cylinder CT, namely, the bar BT1 in FIGURE 1, to be engaged by the slides 5 and transferred to a position near the vertically displaceable shaft AV. The racks 6, 7 together with the slides 4, 5 are longitudinally staggered so that the end position of the slides 4 in the direction of the cylinder CT is stepped back with respect to the end position of the slides 5 in the same direction. Consequently, the end position of the slides 5 in the direction of the transverse plane in which the axis of the vertically displaceable shaft AV is situated, is offset in the direction of the cylinder CT with respect to the end position of the slides 4 in the direction of said transverse plane.

FIGURE 10 shows the end position of the slide 4 in the direction of the cylinder CT. The bar end 14 is released from the hooked end of the pawl 41 through the provision of a cross plate 50 which by acting on the rear nose 51 on the lever 41 has oscillated the lever 41 to disengage its hooked end from the bar end 14 (FIGURE 14). During return of the top slides 4 away from the cylinder CT, the bar, which has been moved by the slides to the position shown in FIGURE 10, is not carried along in the same direction.

The ends 14 of said bar shall be engaged by the pawls 44, 45 on the bottom slides 5 towards the end of the movement of the latter in the direction of the cylinder CT (FIGURE 12). Owing to the phase displacement of the slides 4, 5, the slides 5 engage by their pawls 44, 45 the bar ends and additionally move the bar further in the direction of the cylinder CT towards the position in which the adhesive-coated lining sheet can be transferred from the pincers on the cylinder CT to the pincers on the bar. This position is shown in FIGURE 12 and is the foremost position towards the cylinder CT with respect to the position shown in FIGURE 10 which, as mentioned above, is the position reached by the bar moved by the pawls 40, 41 on the slide 4.

During the next movement the displacement of the slides 5 in the direction of the shaft AV ends when the bar ends 14 engaged by the pawls on the slides 5 take the position shown in FIGURES 11 and 13. In this position the lining sheet received by the pincers on the bar is on the vertically movable platform PT and has been released by the pincers on the bar by a suitable control, known per se, and which need not therefore be described.

In this position the bar is released from the bottom slides 5 by virtue of the bell cranks secured at this region to the plate 12, the top edges 52 of which (FIGURE 15) are so arranged as to fit between the levers 44 and bar ends 14. With this arrangement the slides 5 can be restored in the direction of the cylinder CT without their pawls 44 engaging the bar ends 14.

The bar is subsequently moved in the direction of the cylinder CT by the top slides 4 (FIGURE 8). However, since the stroke length of the slides 4 in the direction of the transverse plane containing the vertically displaceable shaft AV is greater than the stroke length in the same direction of the slides 5, a bridge plate 53 (FIGURE 11) similar to plate 50 (FIGURE 10) is arranged at the same region. The provision of the bridge plate 53 causes the hooked end of the lever 41 to be lifted enough to let the associated bar end 14 through as indicated in FIGURE 11. With this structure the movement in the direction of the cylinder CT of the bar situated near the shaft AV starts shortly after the top slides 4 have started their movement in the same direction.

FIGURE 16 shows the relation of the bars BT1 and BT2 with respect to the longitudinal member 1 with the pincers 15 on the bar BT1 gripping a piece of fabric T prior to shifting the fabric into position over the platform PT. FIGURE 17 is a cross-sectional view through the bar BT1 showing the manner in which the pincers 15 grip the fabric T.

What I claim is:

1. A machine of the type referred to for manufacturing book covers comprising frame means, vertically movable platform means mounted on said frame means and adapted to receive paperboard blanks, a back piece and cloth covering means, transfer means comprising a vertically displaceable and rotatable shaft journaled in said frame and having a suction head thereon adapted to transfer said paperboard blanks onto said platform, cloth supply means adjacent said platform means, guide means secured to said frame along opposite sides of said platform means, means for transferring a glued cloth sheet from said cloth supply means onto said platform comprising a pair of bars arranged in said guide means transversely of said platform and displaceable along said platform, gripping means on each of said bars adapted to grip a cloth cover means, and means for simultaneously moving said bars in opposite directions to transfer a cloth cover means from said supply means to said platform means.

2. Machine as claimed in claim 1, characterized by the fact that the bar paths are defined by said means which comprises a pair of plates each formed with an elongated aperture arranged near the top portion of one machine side wall on the inside of said side wall and parallel therewith, the aperture in the plate being defined at the bottom by a bottom edge rectilinear in profile and at the top by an edge having end portions parallel with said bottom edge and a middle portion comprising two sections inclined to an inverted V shape with respect to the bottom edge; a triangular deflector being arranged within the middle portion of said aperture and a pivot being rotatably mounted in the machine side wall adjacent said plate having said deflector secured thereto, a spring constantly biasing the pivot together with the deflector in a direction to interconnect the end portion of said aperture, turned towards the plane in which the axis of the vertically displaceable shaft carrying the suction heads is situated, and its portion situated above the deflector, and to interconnect the opposite end portion of the aperture with the portion of the latter situated beneath the said deflector when the ends of both bars extending through said aperture are at the opposite end sections of said aperture, whereby the bar ends travel beneath the deflector on their movement away from the cloth supply means and above the deflector during their movement towards the said cloth supply means.

3. Machine as claimed in claim 2, characterized by the fact that the machine comprises one pair at least of slides mounted for movement in superposed longitudinal guides provided in the face turned towards said plate for guiding the bar ends, said slides each carrying a pawl pair adapted to engage the edges turned towards the cloth supply means and the transverse plane of the machine in which the axis of the vertically displaceable shaft carrying the suction heads is situated, respectively, of the ends of both bars reaching through the aperture in said guide plate in the direction of the adjacent machine side wall, said slides being so operated and arranged as to perform equal and simultaneous movements in opposite directions, means being provided for releasing the bar from the pawl on the top slide which engages the edge of the bar end turned towards the cloth supply means when said top slide is in its position near the end of its stroke in the direction of the cloth supply means, further means being provided for releasing the bar from the pawl on the bottom slide engaging the edge of the bar end turned towards the transverse plane in which the axis of the vertically displaceable shaft is situated, when said bottom slide is in its position near the end of its stroke towards said transverse plane, said pawls and said means being so shaped as to restore both slides to their opposite starting positions, without carrying along said two bars.

4. Machine as claimed in claim 3, characterized by the fact that the pawls carried by the top slide are in the form of levers mounted for oscillation about pivots carried by said slide and extending parallel with the bars, said levers extending in the direction of the "cloth cylinder" and being constantly biased downwardly by their own weight, the lever situated farther from the "cloth cylinder" engaging by its free end the edge of the bar end turned towards the transverse plane in which the vertically displaceable shaft is situated during movement of the top slide in the direction of the cloth supply means, the lever near the cloth supply means engaging by its hooked end the other edge of the bar end as well as a rear nose, said levers being of a length such as to engage the bar ends even when the latter are guided in the end portions of the aperture in said guide plate, means being provided for releasing the top slide from the bar and allowing said slide to be restored after having moved the bar to the proximity of the cloth supply means, said means comprising a stationary plate located near the end of the aperture in the guide plate near the cloth supply means so as to lower said rear nose and lift the lever having a hooked end by an extent such that said hooked end reaches above the edge of the bar end turned towards the cloth supply means, thereby permitting the top slide to return without the bar.

5. Machine as claimed in claim 4, characterized by the fact that the pawls carried by the bottom slide comprise levers, a first lever being adapted to engage by its free end the edge of the bar end turned towards the cloth supply means and being mounted for rocking about a vertical pivot in a recess provided in the bottom slide into which said first mentioned lever can be withdrawn against spring action, a second lever being mounted for oscillation about a pivot extending parallel with the bar and being biased by a spring towards a position, defined by a stop, in which it is upwardly inclined and it engages by its free end the edge of the bar end remote from the edge engaged by the first mentioned lever, means being provided for releasing the bottom slide from the bar and permitting return of the slide towards the cloth supply means after the bar has been brought near the plane in which the axis of the said vertically displaceable shaft is situated, said means comprising a plate carried by the guide plate for the bar ends, said plate being positioned to lower said other lever and allow movement over the latter of the end of the bar which has been moved by said bottom slide to the above-mentioned position, whereby the bottom slide can be restored in the direction of the cloth supply means without the bar.

6. Machine as claimed in claim 5, characterized by the fact that said top and bottom slides are staggered so that at the start and end of the movement of the top slide in the direction of the "cloth cylinder" they are moved in opposite directions with respect to said cloth supply means as compared with the start and end of the movement in the same direction of the bottom slide.

7. Machine as claimed in claim 6, characterized by the provision of means adapted to prevent engagement of the bar end released by the bottom slide at the end of the movement of the latter away from the cloth supply means, by the hooked lever carried by the top slide, said means comprising stationary plates adapted to lower the rear nose on said lever and lift the hooked end of said lever above the edge turned towards the cloth supply means of the ends of the bar standing in the position to which it has been moved by the bottom slide at the end of the movement of the latter away from the cloth supply means.

8. Machine as claimed in claim 3, characterized by the fact that the pairs of superposed slides are secured to the ends of racks receiving motion from a common pinion and mounted for displacement in guides formed in the top portion of one at least of the machine side walls, aligned with the guides having the slides slidably mounted therein.

9. Machine as claimed in claim 8, characterized by the fact that the guides for the slides and their respective racks converge in the direction of the cloth supply means.

References Cited by the Examiner
UNITED STATES PATENTS

| | | | |
|---|---|---|---|
| 2,364,142 | 12/1944 | Hildmann | 11—2 |
| 2,656,551 | 10/1953 | Bunch et al. | 11—2 |
| 3,068,501 | 12/1962 | McCahon | 11—2 |

LAWRENCE CHARLES, *Primary Examiner.*